United States Patent [19]

Tobimatsu

[11] Patent Number: 4,954,916

[45] Date of Patent: Sep. 4, 1990

[54] CASSETTE LOADING APPARATUS WITH IMPROVED ACCESS

[75] Inventor: Noriaki Tobimatsu, Kanagawa, Japan

[73] Assignee: Sony Corporation, Tokyo, Japan

[21] Appl. No.: 280,976

[22] Filed: Dec. 7, 1988

[30] Foreign Application Priority Data

Dec. 15, 1987 [JP] Japan .................. 62-190221

[51] Int. Cl.[5] ............................. G11B 15/675
[52] U.S. Cl. ................................... 360/96.5
[58] Field of Search ............ 360/96.5, 96.6, 93, 360/84, 85

[56] References Cited

U.S. PATENT DOCUMENTS

| | | | |
|---|---|---|---|
| 4,641,210 | 2/1987 | Ohyama | 360/96.6 |
| 4,785,364 | 11/1988 | Ando et al. | 360/96.5 |
| 4,794,478 | 12/1988 | Kamezawa et al. | 360/96.5 |
| 4,811,138 | 3/1989 | Park | 360/96.6 |

FOREIGN PATENT DOCUMENTS

| | | |
|---|---|---|
| 0137311 | 9/1984 | European Pat. Off. . |
| 0196623 | 3/1986 | European Pat. Off. . |
| 0203784 | 5/1986 | European Pat. Off. . |
| 1162682 | 8/1966 | United Kingdom . |

Primary Examiner—Robert S. Tupper
Attorney, Agent, or Firm—Lewis H. Eslinger; Jay H. Maioli

[57] ABSTRACT

A cassette recording-medium recording and/or reproducing apparatus has a lid for an opening which is provided in a cabinet, and a cassette holder which is secured inside the lid, and together with the lid, moved into its cassette receiving position, as the lid is moved toward its opening position to uncover the opening. The cassette holder is made to slide in a withdrawn direction of the cassette with respect to the lid, while the cassette holder is moved into the cassette receiving position, so that it becomes very easy to withdraw the cassette from the cassette holder by hand, because the lid does not interfere with the manual operation.

3 Claims, 8 Drawing Sheets

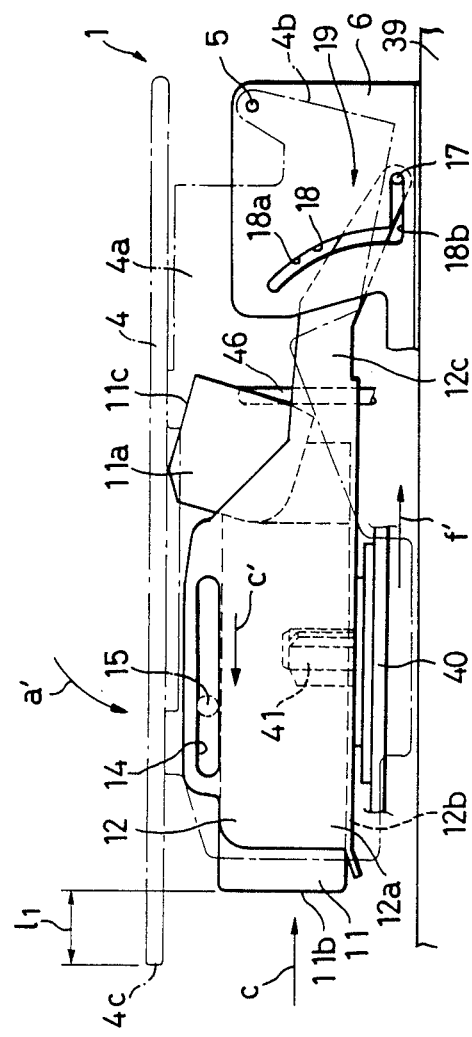

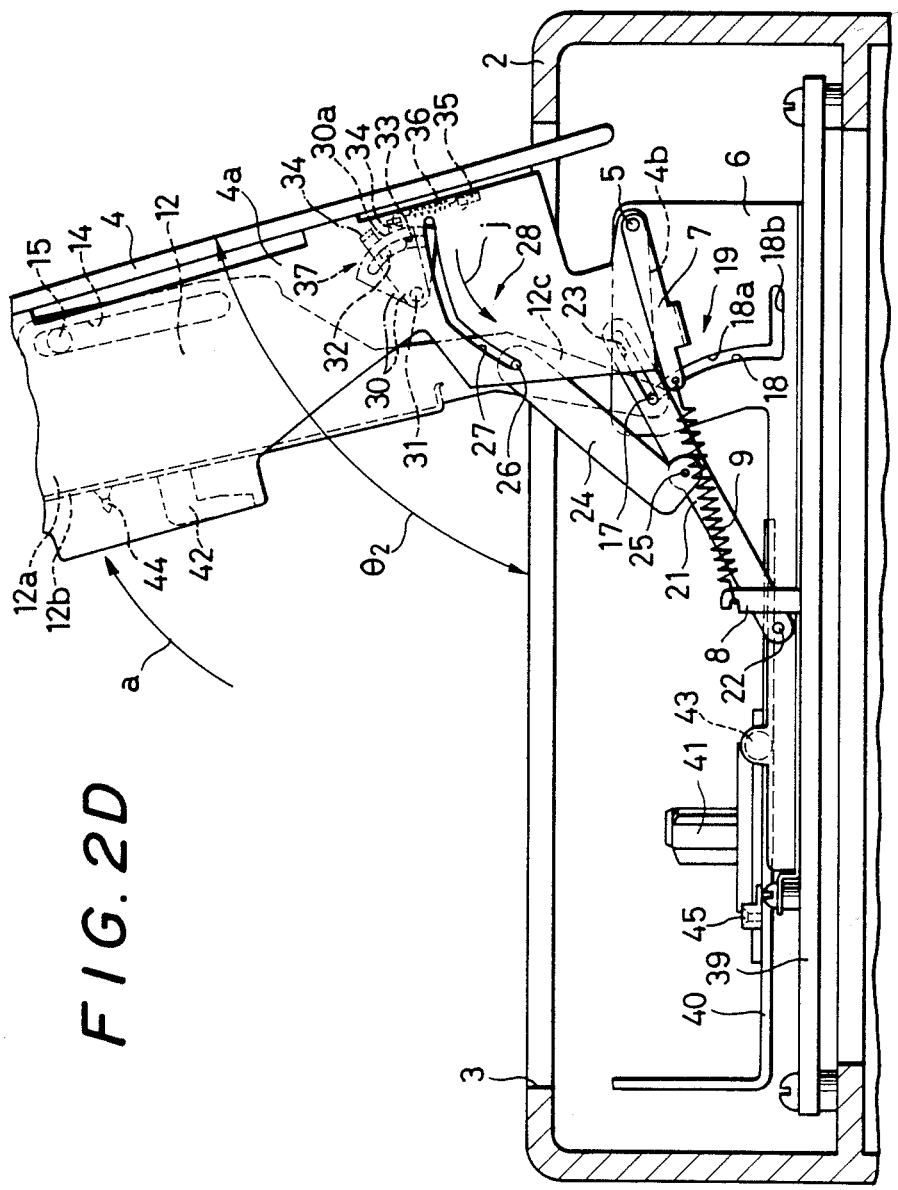

CASSETTE LOADING APPARATUS WITH IMPROVED ACCESS

BACKGROUND OF THE INVENTION

1. Field of the Invention

This invention relates generally to a cassette recording-medium recording and/or reproducing apparatus, more particularly is directed to the cassette loading and unloading device of the apparatus, and is suitably applied to a cassette tape VTR, the cassette holding means of which is secured inside the lid thereof.

2. Description of the Prior Art

In cassette tape VTR and the like, the cassette holder in which the cassette is inserted, is integrally secured inside the lid so as to enable the cassette holder to be moved between the cassette receiving position and the cassette loading position due to opening and shutting of the lid. However, in such a cassette loading and unloading device, it becomes difficult to withdraw the cassette by hand as the cassette is more deeply inserted into the cassette holder, because the lid interferes with the manual operation.

OBJECTS AND SUMMARY OF THE INVENTION

Accordingly, it is an object of the present invention to provide a cassette recording-medium recording and/or reproducing apparatus which avoids the above described problem associated with the prior art.

More particularly, it is an object of this invention to provide a cassette recording-medium recording and/or reproducing apparatus, in the cassette loading and unloading device of which a cassette held by the cassette holder is automatically projected with respect to the lid thereof in a withdrawn direction of the cassette, while the cassette holder is moved from a cassette loading position to a cassette receiving position due to the uncovering movement of the lid, so that it becomes very easy to withdraw the cassette by hand in the cassette receiving position, because the lid does not interfere with the hand operation.

In accordance with an aspect of this invention, a cassette recording-medium recording and/or reproducing apparatus comprises:

cover means for covering and uncovering an opening provided in a cabinet;

cassette holding means secured inside the cover means so as to be located in a cassette receiving position settled outside the opening, as the cover means is moved toward its opening position to uncover the opening, and to be located in a cassette loading position settled within the cabinet, as the cover means is moved toward its shutting position to cover the opening; and driving means fixed to a chassis arranged within the cabinet so as to drive a recording-medium accommodated in a cassette, which has been brought into the cassette loading position by the cassette holding means after inserted into the cassette holding means in the cassette receiving position;

wherein the cassette holding means is made to slide with respect to the cover means in a withdrawn direction of the cassette, while the cassette holding means is moved from the cassette loading position to the cassette receiving position.

In a preferred embodiment of this invention, the end of the cassette holding means of the same side as that of the loading end of the withdrawn cassette, is also separated from the inside of the cover means, while the cassette holding means is moved from the cassette loading position to the cassette receiving position due to the uncovering movement of the cover means, so that it becomes much easier to withdraw the cassette by hand.

The above, and other objects, features and advantages of this invention, will be apparent in the following detailed description of an illustrative embodiment thereof which is to be read in connection with the accompanying drawings wherein like reference numerals identify the corresponding parts in the several views.

BRIEF DESCRIPTION OF THE DRAWING

FIGS. 1A to 1C are schematic views illustrating the function of a cassette loading and unloading device incorporated in a cassette recording-medium recording and/or reproducing apparatus according to an embodiment of this invention;

FIGS. 2A to 2D are detail views illustrating the function of the cassette loading and unloading device of FIGS. 1A to 1C.

DETAILED DESCRIPTION OF A PREFERRED EMBODIMENT

Figure 2A:
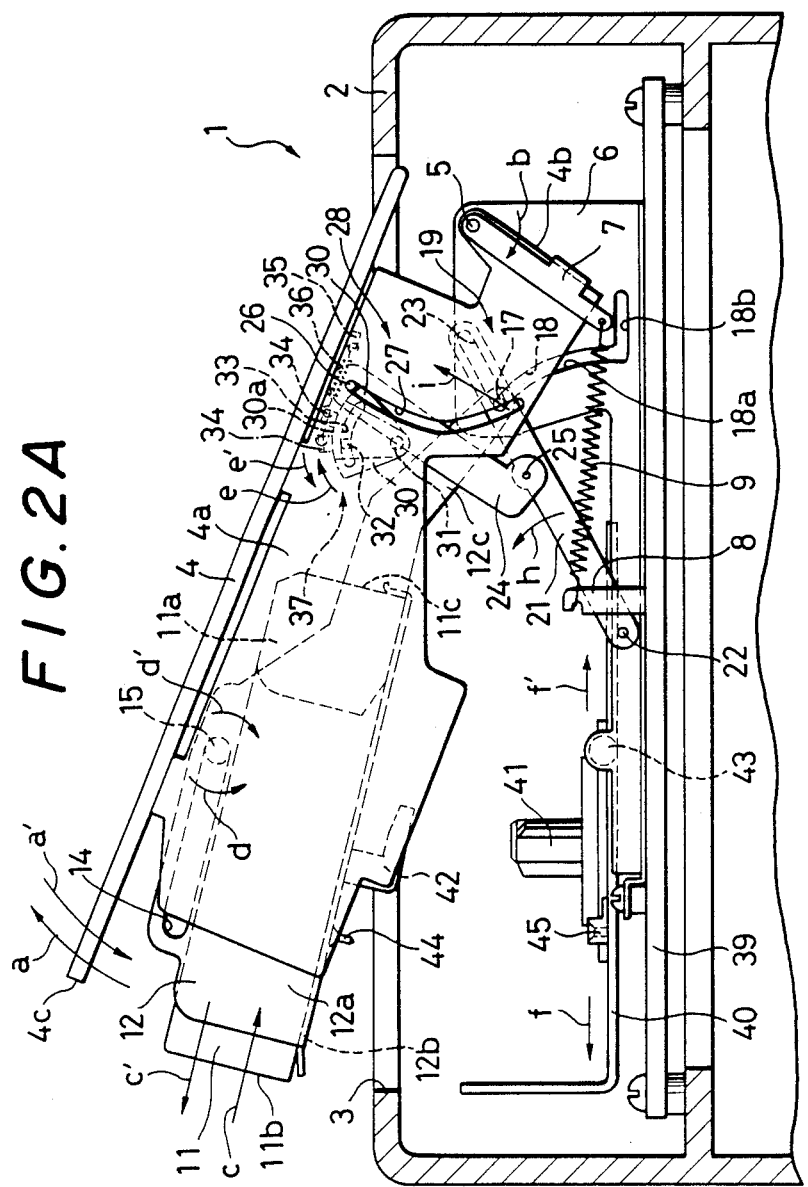
Figure 2B:
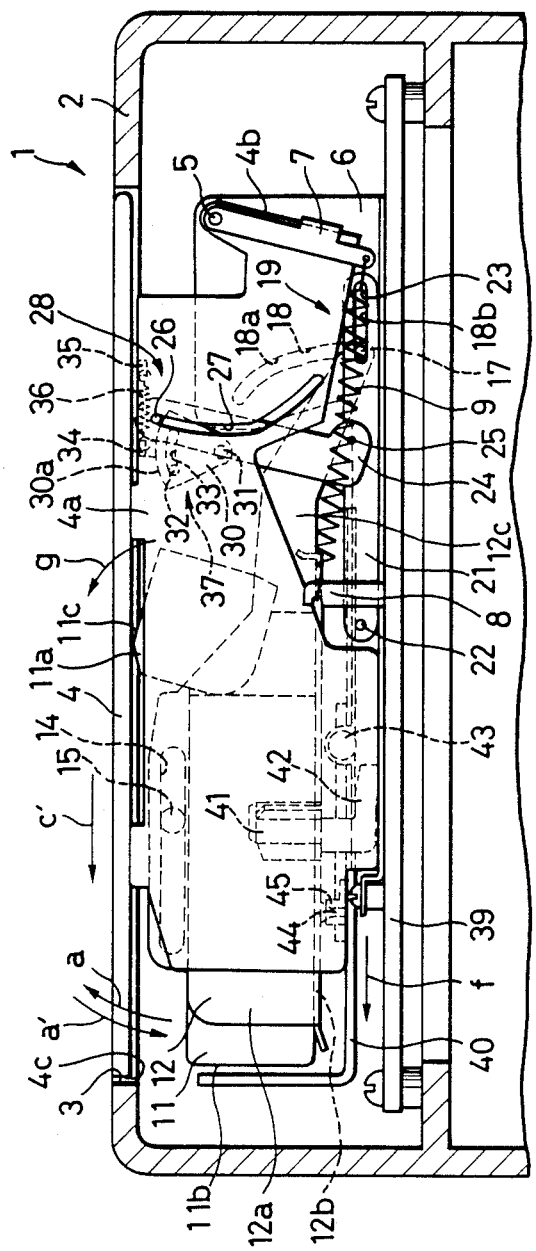

A cassette tape VTR embodying the present invention will be described with reference to the drawing in detail. As shown in FIGS. 2A and 2B, an opening 3 necessary for loading and unloading cassettes 11 is provided in the cabinet 2 of the VTR 1, and is covered and uncovered by a lid 4, a pair of right and left side plates 4a of which are inserted in the cabinet 2 through the opening 3.

The front ends of the respective side plates 4a, the ends of the same sides as that of the leading end of the cassette inserted as described later, are pivotally supported within the cabinet 2 by a pair of pivots 5 which project from a pair of support plates 6 fixed to a chassis 39 and arranged inside the side plates 4a. Thus, the lid 4 is swung in a direction of arrows a and a' on the pivots 5, and located in an opening position shown in FIG. 2A and in a shutting position shown in FIG. 2B.

A pair of right and left tension springs 9 are stretched between a pair of spring stops 8 provided in the respective support plates 6, and the free ends of a pair of levers 7, which are pivotally supported by the respective pivots 5 and pressed against the cutting edges 4b of the side plates 4a from the side indicated by arrow b in FIG. 2A, so that the lid 4 is urged toward the opening position thereof.

Secured inside the lid 4 is a cassette holder 12 in which the cassette 11 is inserted in a direction of arrow c and held as shown in FIG. 2A. The cassette holder 12 is substantially channel shaped in section, and the cassette 11 is held within a space 13 (see FIG. 3) formed by a pair of right and left side plates 12a of the cassette holder 12, and a pair of bottom plates 12b horizontally extending from the respective lower edges of the side plates 12a.

A pair of elongate holes 14 are provided in the side plates 12a of the cassette holder 12 along the upper edges of the side plates 12a, that is, in parallel with arrows c and c' in FIG. 2A, which show the directions of the cassette 11 being inserted and withdrawn, respectively. Further, a pair of pins 15 projecting from the insides of the side plates 4a of the lid 4 are loosely fitted in the respective elongate holes 14. Thus, the cassette holder 12 is movable in the direction of arrows c and c' in FIG. 2A and also, swingable on the pins 15 in a direction of arrows d and d' in FIG. 2A with respect to the lid 4.

Figure 1A:
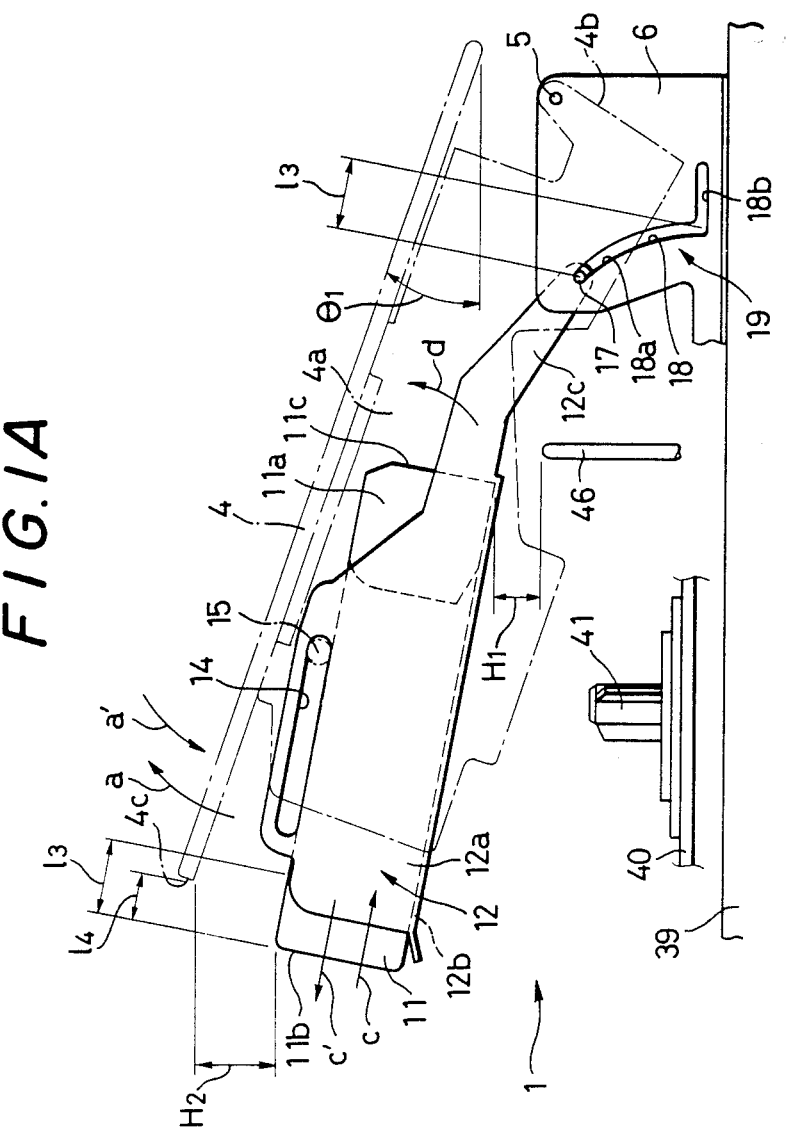

A pair of arms 12C extend in an inserted direction of the cassette 11 from the side plates 12a of the cassette holder 12, and as shown in FIG. 1A, a pair of cam follower pins 17 outwardly projecting from the distal ends of the arms 12C are loosely fitted in a pair of cam guide grooves 18 provided in the support plates 6. The guide grooves 18 are substantially L-shaped: the vertical portions 18a of the grooves 18 are gradually biased in a withdrawn direction of the cassette 11, that is, in the direction of arrow c' in FIG. 1A from the lower ends thereof, and the horizontal portions 18b of the grooves 18 horizontally extend in an inserted direction of the cassette 11, that is, in the direction of arrow c from the lower ends of the vertical portions 18a. The pins 17 and guide grooves 18 constitute a guide mechanism 19 of this invention.

As shown in FIG. 2A, a pair of right and left links 21 are pivotally mounted on pivots 22 projecting from the support plates 6, and elongate holes 23 are provided near the free ends of the links 21. Further, the pins 17 of the cassette holder 12 are loosely fitted in the elongate holes 23.

A pair of links 24 are pivotally mounted, at their ends, on pivots 25 projecting from substantially the central portions of the links 21, and a pair of pins 26 projecting from the other ends of the links 24 are loosely fitted in a pair of arcuate guide grooves 27 provided in the side plates 4a of the lid 4. Thus, a second guide mechanism 28 is constituted of the links 21 and 24, the guide pins 26, and the guide grooves 27.

A pair of substantially fan-shaped right and left locking plates 30 are mounted on pivots 31 at the inner sides of the side plates 4a of the lid 4 so as to be swung in a direction of arrow e and e' in FIG. 2A near the upper ends of the guide grooves 27, and a pair of pins 32 projecting from the side plates 4a are loosely fitted in arcuate grooves 33 provided in the locking plates 30.

Figure 3:
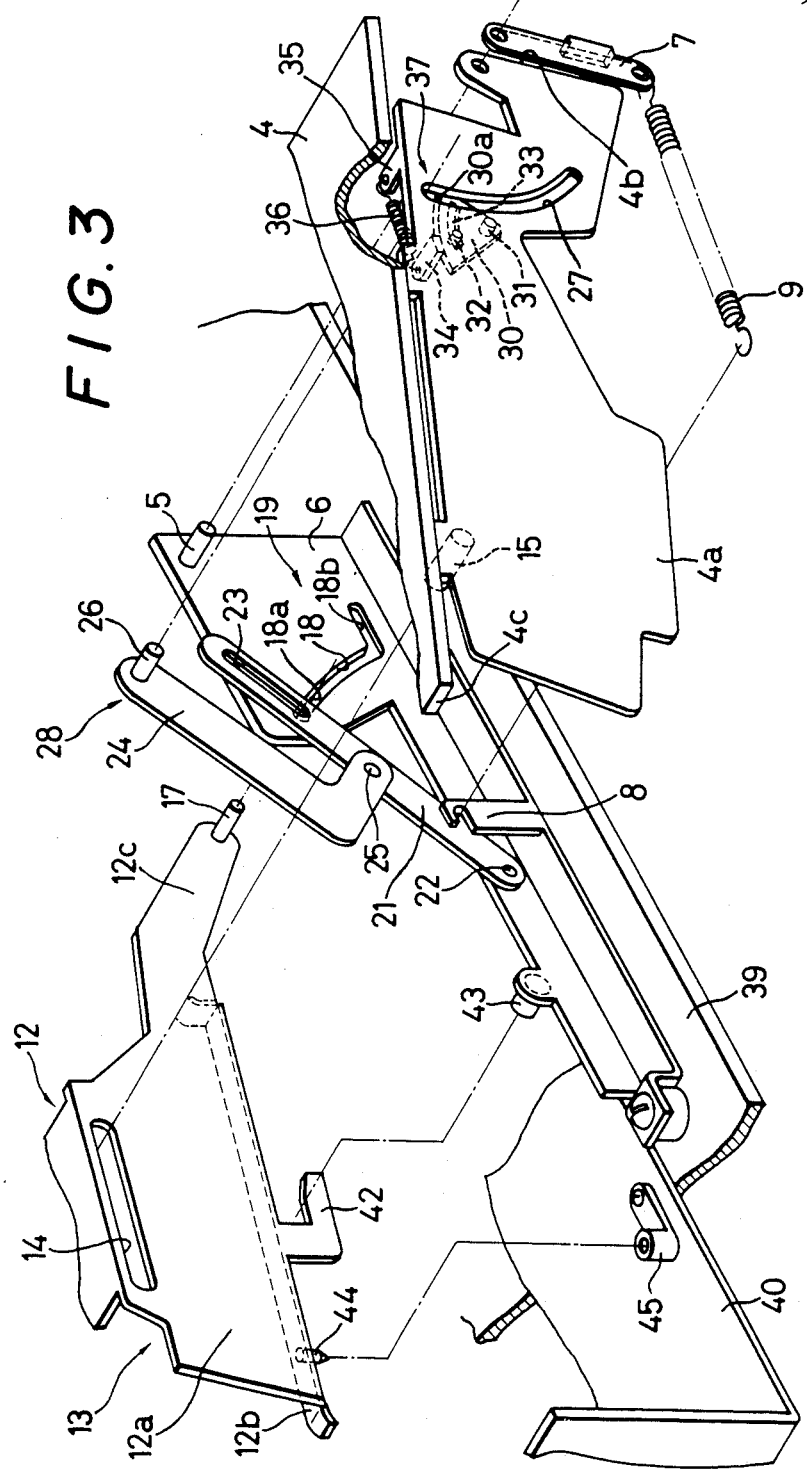
FIG. 3 is an exploded, perspective view of the cassette loading and unloading device of FIGS. 1A to 1C.

The locking plates 30 are urged in the direction of arrow e in FIG. 2A by a pair of tension springs 36 which are stretched between spring stops 34 and 35 shown in FIG. 3, respectively provided on the locking plates 30 and the side plates 4a, and stopped in a position indicated in solid lines in FIG. 2A. Under that state, the pins 26 are sandwiched between the circular faces 30a formed at the upper ends of the locking plates 30, and the upper ends of the guide groove 27 as shown in FIG. 2A. Thus, the pins 26 are locked by a locking mechanism 37 which comprises the locking plates 30 and the tension spring 36.

The pair of support plates 6 are fixed to a fixed chassis 39 provided in the cabinet 2, and between the support plates 6, there is a movable chassis 40, on which a pair of right and left reel bases 41 are mounted. The movable chassis 40 is horizontally moved in a direction of arrows f and f' in FIG. 2A along the fixed chassis 39 by a chassis driving mechanism (not shown) so that the reel bases 41 may be located in pertinent positions adjacent to and separate from a recording and/or reproducing mechanism.

Next, a pair of locking pins 43 project inwardly from the support plates 6, and when the pair of locking pins 43 engage with a pair of substantially L-shaped locking arms 42 projecting from the lower edges of the side plates 12a of the cassette holder 12, the cassette holder 12 is locked. Further, a pair of apertures 45 are provided on the movable chassis 40 so as to be engaged with a pair of pins 44 projecting downward from the bottom plates 12a of the cassette holder 12.

Now, the function of the above-mentioned cassette loading and unloading device will be described on reference to FIG. 1A to 2D.

Figure 1B:
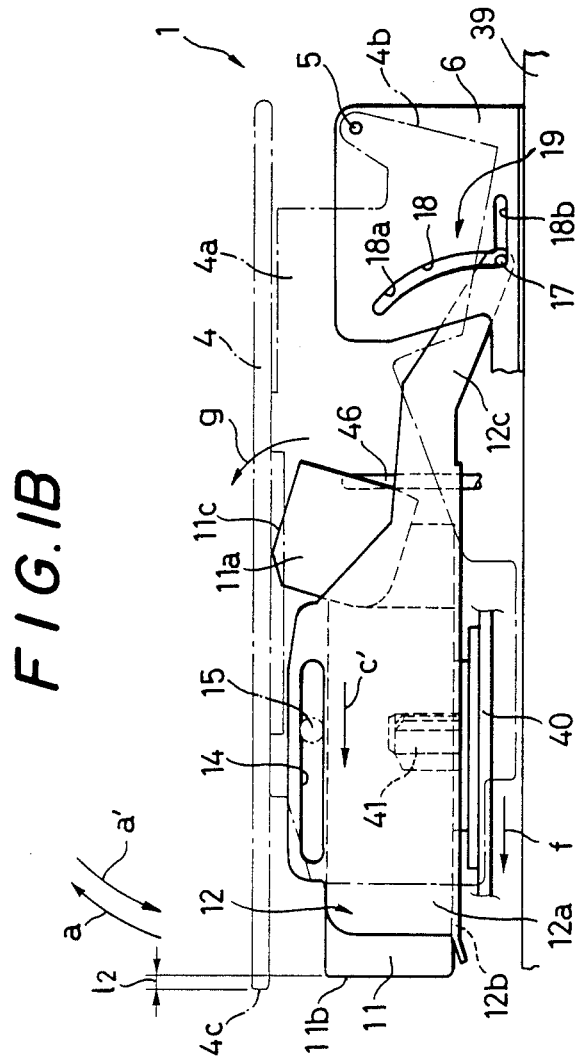

When the lid 4 is swung in the direction of arrows a and a' between the opening position shown in FIGS. 1A and 2A, and the shutting position shown in FIGS. 1B and 2B, the cassette holder 12 is moved also in the direction of arrows a and a' between the cassette receiving position shown in FIGS. 1A and 2A, and the cassette loading position shown in FIGS. 1B and 2B.

When the cassette holder 12 is located in the cassette receiving position, the cassette 11 is inserted in the cassette holder 12 in the direction of arrow c shown in FIGS. 1A and 2A, and when the lid 4 is swung in the direction of arrow a' against the force of the spring 9 and shut as shown in FIGS. 1B and 2B, the cassette holder 12 reaches the cassette loading position and the cassette 11 in the casette holder 12 is mounted on the reel bases 41. The pins 44 are engaged with the apertures 45 so as to make the cassette holder 12 combine with the movable chassis 40, and by that time, the front lid 11a of the cassette 11 is opened in a direction of arrow q in FIG. 1B. Further, a tape loading member 46 is inserted in the rear of the magnetic tape (not shown) accommodated in the cassette 11.

Figure 2C:
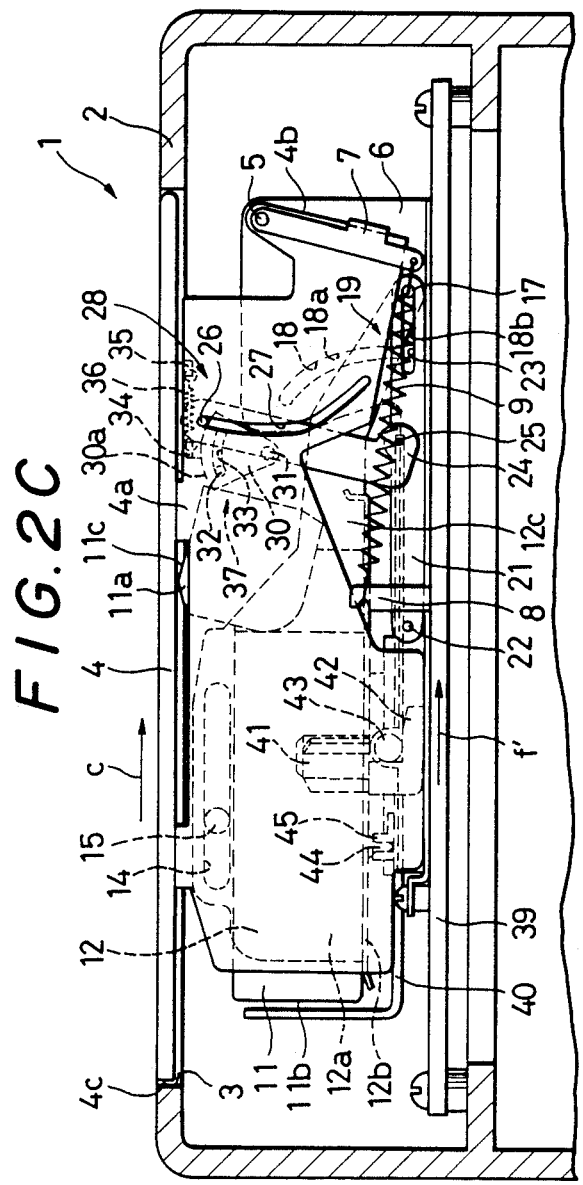

Next, as the movable chassis 40 is moved in the direction of arrow f' in FIG. 1C and 2C along the fixed chassis 39, the cassette holder 12 is moved in the direction of arrow c with respect to the lid 4, so that the locking arms 42 are engaged with the locking pins 43, and the lid 4 and the cassette holder 12 are locked in the shutting position and in the cassette loading position, respectively.

Moreover, due to the movement of the cassette holder 12 in the direction of arrow c, cassette 11 approaches the recording and/or reproducing mechanism which comprises a rotary head drum and so forth, and the magnetic tape drawn from the cassette 11 by the tape loading member 46 is loaded in the recording and-/or reproducing mechanism, so that recording or reproducing is performed.

Next, at the time when recording or reproducing is finished, the pins 17 of the cassette holder 12 are positioned adjacent to the distal ends of the horizontal portions 18b of the guide grooves 18 as shown in FIG. 1C, but when the movable chassis 40 is moved in the direction of arrow f in FIG. 1B in order to take out the cassette 11 from the apparatus, the pins 17 come to the lower ends of the vertical portions 18a of the guide grooves 18 as shown in FIGS. 1B and 2B, so that the length between the rear end 11b of the cassette 11, and the distal end 4c of the lid 4 varies from $l_1$ shown in FIG. 1C to $l_2$ shown in FIG. 1B (the rear end 11b and the distal end 4c are the ends of the same side as that of the leading end of the withdrawn cassette 11).

Moreover, when the cassette holder 12 is moved to a position shown in FIG. 2B, the locking arms 42 are disengaged from the locking pins 43, so that the lid 4 and the cassette holder 12 are unlocked. As the result, the lid 4 is opened by the force of the tension spring 9 and reaches the opening position thereof as shown in FIGS. 1A and 2A. Simultaneously, the cassette holder 12 is moved in the direction of arrow a and reaches the receiving position thereof. Thus, the cassette 11 moves upward to be free from the reel bases 41 and the tape loading member 46, and to get out of the cabinet 2. In addition, the pin 44 is disengaged from the aperture 45.

As the lid 4 is swung on the pivots 5 in the direction of arrow a as shown in FIG. 2A, the links 21 are pulled up by the links 24, the pins 26 of which are locked, and swung on the pivots 22 in a direction of arrow h, so that the pins 17 of the cassette holder 12 are moved in a direction of arrow i to approach to the lid 4 due to the cooperation of the elongate holes 23 of the links 21 and the arcuate vertical portions 18a of the guide grooves 18. Thus, the cassette holder 12 moved in the direction of arrow c' by the lid 4, is simultaneously swung on the pins 15 in the direction of arrow d with respect to the lid 4.

As the result, even though the angle $\theta_1$ of the lid 4 with the case 2 shown in FIG. 1A is comparatively small, the front end 11c of the cassette 11, that is, the leading end of the cassette 11 when inserted in the direction of arrow c, is held in a position of height $H_1$, which is far apart upward from the top of the tape loading member 46, and also, the rear end 11b of the cassette 11 is held in a position of height $H_2$ which is far apart downward from the distal end 4c of the lid 4.

Moreover, while the cassette holder 12 pulled up by the lid 4 is moved in the direction of arrow a as shown in FIG. 1A, the pins 17 of the cassette holder 12 guided by the arcuate vertical portions 18a of the guide grooves 18 are moved by length $l_3$ in the direction of arrow c', that is, in the withdrawn direction of the cassette 11 with respect to the lid 4 , so that when the cassette holder 12 reaches the cassette receiving position thereof as shown in FIG. 1A, the rear end 11b of the cassette 11 held in the cassette holder 12 is moved in the direction of arrow c' from the position shown in FIG. 1B by substantially the same length as length $l_3$. Thus, the rear end 11b of the cassette 11 automatically projects in the direction of arrow c' with respect to the distal end 4C of the lid 4 by length $l_4$.

As the result, it is easy to hold the end 11b of the cassette 11 with fingers, because the fingers are not interfered with the end 4c of the lid 4, so that the cassette 11 is very easily withdrawn in the direction of arrow c' from the cassette holder 12. Further, as the rear end 11b of the cassette 11 is spaced apart from the distal end 4C of the lid 4 by the height $H_2$, it becomes easier to hold the rear end 11b with fingers.

Next, if the locking plates 30 shown in FIG. 2A are swung in the direction of arrow e' on the pivots 31 against the force of the tension spring 36 so as to unlock the pins 26, the pins 26 become movable in a direction of arrow j in FIG. 2D, so that the lid 4 can be largely swung in the direction of arrow a on the pivots 5 by angle $\theta_2$ in FIG. 2D. The largely opened opening 3 of the cabinet 2 will facilitate the maintenance of the apparatus.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims. The invention is applied not only to the cassette tape VTR but also to recording and/or reproducing apparatus of various kinds for cassette recording-media, such as cassette tapes, cassette disks and the like.

What is claimed is:

1. A cassette recording-medium recording and/or reproducing apparatus comprising:

a cabinet;

cover means moveable between a closed position and an open position for covering and uncovering an opening provided in said cabinet;

cassette holding means slidably engaged inside said cover means so as to be located in a cassette receiving position that is outside said opening when said cover means is moved to its open position to uncover said opening and to be located in a cassette loading position that is within said cabinet when said cover means is moved to its closed position to cover said opening;

a chassis mounted within said cabinet;

driving means fixed to said chassis for driving a recording-medium accommodated in a cassette that has been brought to said cassette loading position by said cassette holding means after being inserted into said cassette holding means in said cassette receiving position; and guide means connected to said cassette holding means for causing said cassette holding means to slide with respect to said cover means in a direction substantially the same as a direction in which said cassette is withdrawn from said cassette holding means, when said cassette holding means is moved from said cassette loading position to said cassette receiving position, said guide means comprising support plate means fixed with respect to said cabinet, and cam means and cam follower means each connected to one of said cassette holding means and support plate means, said cam follower means engaging said cam means to cause relative sliding movement between said cassette holding means and said cover when said cover is moved between said closed position and said open position.

2. An apparatus according to claim 1, wherein the end of said cassette holding means on the same side as that of the leading end of the withdrawn cassette is caused to move away from the inside of said cover means, when said cassette holding means is moved from said cassette loading position to said cassette receiving position during said uncovering movement of the cover means.

3. An apparatus according to claim 1, further comprising means connected to said cover means adjacent an end thereof and pivotally mounting said cover means with respect to said chassis.

* * * * *